United States Patent Office 3,282,321
Patented Nov. 1, 1966

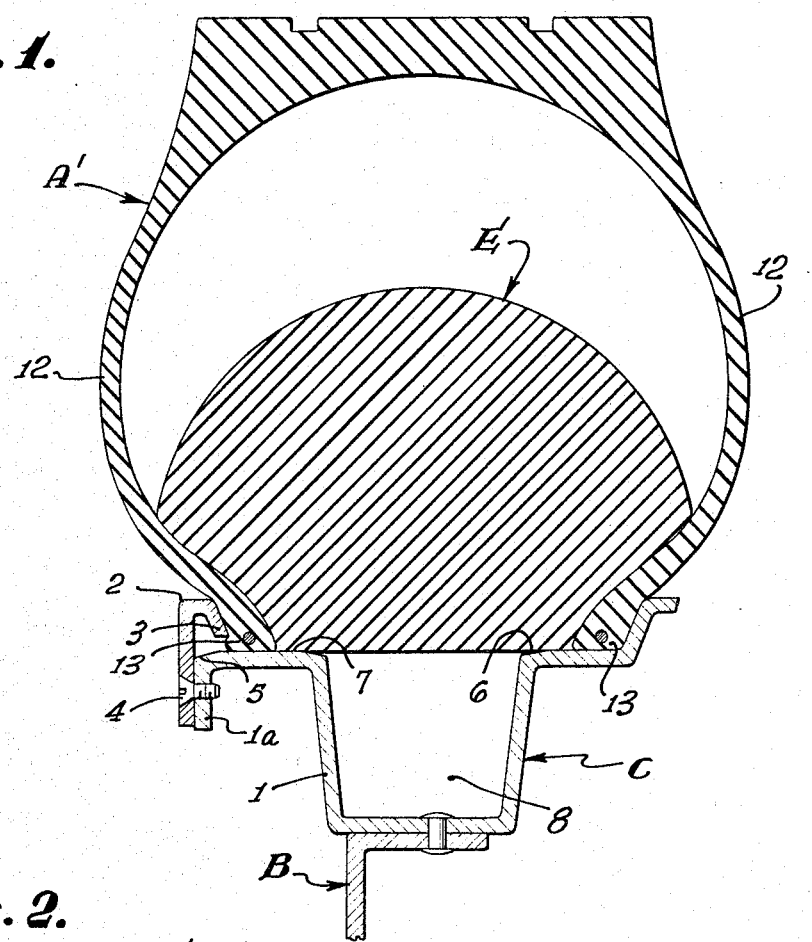
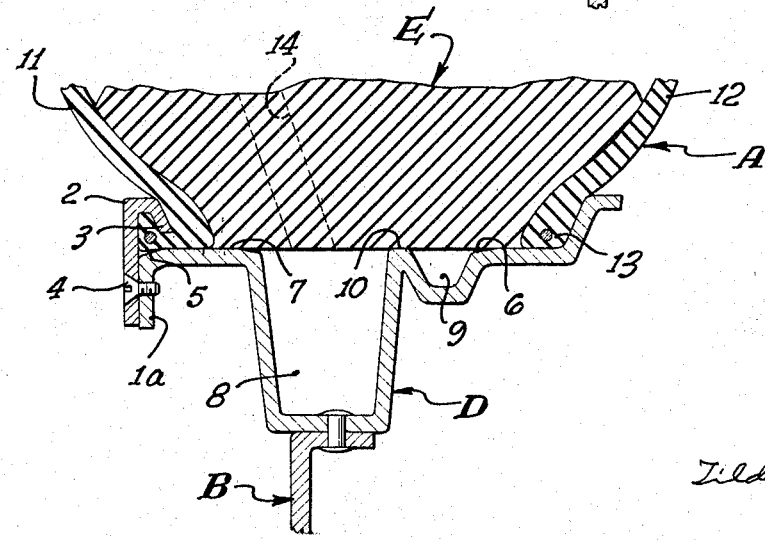

3,282,321
RIMS FOR SAFER PNEUMATIC WHEEL ASSEMBLY
Tilden William Johnson, 5630 Sawtelle Blvd., Culver City, Calif.
Filed Jan. 11, 1965, Ser. No. 424,745
6 Claims. (Cl. 152—379)

This invention relates to an improved rim to facilitate pneumatic wheel assemblies capped by tubeless tires with higher all-round factor of safety than is now available.

The present invention is a continuation-in-part for the two piece rim component in my copending application Ser. No. 175,926 now Patent No. 3,172,447 for a Safety Wheel and Components Therefor, and sets forth matter disclosed in said copending application and further improvements in the said rim components of the safety wheel.

At the present time, pneumatic wheel assemblies have great efficiencies and high factors of safety for loads in certain directions as long as the tire remains inflated. But for loads in certain directions and for certain road conditions present pneumatic wheel assemblies have factors of safety for certain road conditions certain to be encountered at times that are far below the factors of safety enforced in aircraft manufacture and in building construction. These low factors of safety for certain road conditions have not been corrected in the past because no one has come up with an assembly construction whereby they could be corrected without seriously reducing the factors of safety in other directions.

The most serious deficiencies of present pneumatic wheel assemblies comprising drop center rims and tubeless tires is that the factor of safety is very low against dirt wedging between tubeless tire and rim in dirt curve negotiation, loss of air from sidewall pressure when suddenly swerving over rough roads with cracks and ridges, loss of tire air completely upsetting the braking system of the car and seriously interfering with car equilibrium.

It is the purpose of this invention to set forth a rim construction that will make it possible to install the wide, high, strong rim extensions or tire buffers with adequate flexibility for high speed travel inside tubeless tire covers with more efficiency than present practice so that the use of such safety buffers or flexible rim extensions become common practice. The invention also helps solve the heat problem of buffers.

Other objects and advantages of this invention will further become apparent hereinafter and in the drawings in which:

FIGURE 1 shows a typical cross section left side view of one specie of this improved rim as used with a pneumatic tubeless tire. The possibility of using the rim extension or tire buffer shown is apparent. Note how the buffer shown or even a tire shield now in current use can be extended under the tubeless tire bead and secured inside the hooked removable rim flange so the tire bead is held laterally against dangerous dirt wedging. Note how this inwardly turned hook makes possible flange securing forcing the tubeless tire bead to an airtight fit over the increasing diameter rim bevel adjacent to the removable flange. Note wide tire, buffer bead seats, strong flanges, deep drop centers as combined to facilitate buffer installation and use.

FIGURE 2 shows a typical cross section left side view of another specie of the rim of this invention especially suitable for tubeless tires with a hooked bead, extensible bead and adjacent sidewall annulus. The possibility of installing the wide, high, flexible adeqaute rim extension or buffer shown is apparent. Note hooked removable rim flange tip serving as the usual wire bead core of this hooked bead tubeless tire for airtight fit to the rim and lateral holding against dirt wedging. The double drop center facilitates installation and central support or lateral securing of said buffer.

Referring to the drawings by letters and numerals: Letter A represents a special tubeless tire with one bead and sidewall extensible with the rim flange replacing the usual inextensible tire bead cable. Shown for reference only as in combination.

Letter A' represents a usual tubeless tire used in combination, no part of this invention and shown for illustrative purposes only.

Letter B represents a fragmentary section of the rim web and is no part of this invention.

Letter C represents the improved rim subject of this invention.

Letter D represents another specie of this safety rim with two drop centers and is the subject of this invention.

Letter E represents an adquate wide, high, flexible rim extension or tire buffer; FIGURES 1 and 2 show bufler structures illustrated as means for extending rims or buffering tires and is part of the combination of this application, though other type buffers can be used.

Numeral 1 represents the main section of the rim of this invention and is the same as letter C. Its principal characteristics are: provision for removal of one tire retaining flange, both tire bead seats beveled so that the greatest rim bead seat diameter occurs as both beads are forced by the fastening of the removable rim flange towards the car centerline side of the rim, wide tire bead seats able to also locate and hold a tire buffer alongside the tire, and an unusually deep drop center to provide air space to replace air space to be used by the buffer, a hooked removable flange serving with the hook tip as the usual wire bead core of tubeless tires as shown and capable of holding the tire bead against dangerous dirt wedging.

Numeral 2 represents the removable rim flange which in FIGURE 1 has a hooked shape to fit into the hooked extensible tubeless tire bead and as fastened to the rim forces bead rubber to an airtight fit with the rim bead seat as the rim diameter increases compressing the rubber bead as the flange is bolted tight to the rim.

Numeral 3 represents the extreme tip of the hooked end of removal flange 2. It serves as a hooked tire bead's wire core and holds the tire bead against dirt wedging. It also serves as the retaining flange for regular tubeless tires.

Numeral 4 represents a bolt to fasten the removable rim flange to the main rim. It is more likely to be a countersunk Allen headed screw having no outside projection.

Numeral 5 represents the tire bead seat rim bevel direction next to the removable flange.

Numeral 6 represents the tire bead seat rim bevel direction of the car side rim bead seat. It should be noted both 5 and 6 bevel in the same direction so that the fastening removable flange not only forces an airtight fit on the removable flange tire bead seat side but also when a buffer fills the void between tire beads also forces the tire bead on the car side of the rim to an airtight fit.

Numeral 7 represents the wide substantially flat part of tire and buffer bead seats. It should be noted there is a minimum rounding or beveling adjacent to the drop center on both edges so this rim can be used for tires that are installed in regular rims. It should be noted the rim bead seat is wide enough to seat tubeless tires and buffer beads. This feature enables strong rubberlike buffer beads to offer considerable stretch resistance to being pulled over the rim flanges in swerves.

Numeral 8 represents the unusually deep drop center so increased air space is available to replace tire air space utilized by the buffer. Holes in the buffer enables air to circulate from the uppermost heated enclosed air to this drop center where increased iron area radiates heat from the enclosed air.

Numeral 9 represents the additional shallow drop center to facilitate installation of tires and buffers and to form item 10.

Numeral 10 represents the division between the two drop centers and serves to attach a safety catch on the buffer so the buffer cannot move laterally and serves to support some types of buffers in the center.

Numeral 11 represents the extensible sidewall of the tubeless tire in FIGURE 2, is for reference only and is not part of this invention except as illustrated in combination.

Numeral 12 represents a normal tubeless tire sidewall and is for reference only and is no part of this application for a rim invention except as referred to in combination.

Numeral 13 represents the usual substantially inextensible tubeless tire bead cable or wires which when forced over a rim bead seat of sufficient diameter compresses tire bead rubber against the rim bead seat for an airtight fit. It is no part of this invention except as referred to in combination.

Numeral 14 represents in FIGURE 2 a hole through the buffer to permit air circulation from the heated top air of the enclosing tire to the iron rim drop center which iron radiates the heat from the enclosed air. In FIGURE 1 this numeral 14 represents like holes in the shown type of buffer.

This type of rim can as shown in FIGURE 1 be used with either a regular tubeless tire and numerous types of buffers by first installing the buffer into the tire and then installing the tire and buffer as a unit on the rim. As the rim is secured the tire beads on both sides are progressively forced by bolt tightening of the removable flange with the hooked bead over increasing diameters of the rim tire bead seat bevel until the inextensible wire bead cores of the tire beads compress enough rubber between said bead cores and said rim to effect an airtight fit. Then the tubeless tire is inflated. To remove the tire and buffer it is only necessary to remove the removable flange and force the tire and buffer from the rim.

There are now available tubeless tires with extensible sidewalls and beads having a hooked shape as shown in FIGURE 2. With this tire sturdier buffers can be used as the tire sidewall can be stretched over said buffers and then the unit placed on the rim and the hooked removable flange tip is placed inside the reverse complementary hooked bead and as the flange is bolted to the rim the tip of said hooked flange acts as the inextensible wire bead core of the hooked bead tubeless tire and gradually compresses enough rubber between the tip of said flange hook and the increasing diameters of the beveled rim until an airtight fit is reached, for the tire bead near or adjacent to said removable flange and the other tire bead is forced by some type buffers to an airtight fit at the same time.

One advantage of this specially constructed rim is that it enables the use of buffers wide, high and flexible that are constructed to avoid enclosing tire sidewall contact except when shock loads are encountered and immediately adjacent to the region of limited tire flexing just above and below the top of the rim flanges. This type of buffer can have ample apertures or holes for air to circulate to the big drop center rim for more air volume and heat radiation, which solves a heat problem.

From the foregoing, it is apparent I have invented a novel and useful rim and combination that will implement and make easier the installation and use of adequate rim extensions for tire buffers that will increase the factor of safety of pneumatic wheel assemblies, the object of this invention.

Several embodiments have been described varying as to buffer, rim, tire and car load requirements. The preferred embodiment therefore is that most adapted to the class of use performed. The best mode is that in FIGURE 1 when the tubeless tire sidewall can be extended by one or more slits for buffer enclosure and then slits sealed for installation.

Having now described and illustrated one form of my invention and species thereof, I wish it to be understood that my invention is not to be limited to the specific form or arrangement of parts herein described and shown, or specifically covered by my claims.

The detailed description of the particular embodiments of the invention illustrated and described herein is not to be construed as limiting the invention thereto. The invention includes all features of patentable novelty residing in the foregoing description and the accompanying drawings.

I claim:

1. In combination, a rim having mounted thereon a tubeless tire and a cushion positioned interiorly and (coextensive) with the tire and filling a substantial portion thereof: said tubeless tire including inextensible wire bead cores having diameters corresponding to the diameter of the rim, said rim being of the drop center type, and having along the edges of said drop center, aligned substantially flat tire bead and buffer seats, the outer ends of said seats being bordered by upstanding flanges against which said beads bear, one of said flanges being removable to facilitate assembling the rim, tire and/or buffer, said buffer filling a substantial portion of the tire and having on its radially inner surface substantial seating contact with the aligned seats of the rim to provide a safety inner tire.

2. In combination, a rim having mounted thereon a tubeless tire and a cushion positioned interiorly and (coextensive) with the tire to a radius point greater than any portion of said rim, and said cushion filling a substantial portion thereof: said tubeless tire including inextensible wire bead cores having diameters corresponding to the diameter of the rim whereby said tire beads when forced over increasingly beveled diameters effect an airtight seal with said rim, said rim being of the drop center type having one or more drop centers, and having along the outer edges of said drop center aligned substantially flat tire bead and buffer seats with only minimum radial and lateral rounded bevels from said drop center to said substantially flat tire and buffer seats, the outer ends of said seats being bordered by upstanding flanges against which said beads bear, said flanges having substantial tops capable of bearing the entire loads of said buffers, one of said flanges being removable to facilitate assembling the rim, tire and/or buffer, one of said drop centers being unusually deep to replace air space used by said buffer and to provide more iron radiating surface to radiate heat from enclosed air, said buffer seat being wide enough that a rubber buffer bead can provide substantial stretch resistance to being pulled over said rim flange, means to hold tire and buffer beads laterally against dirt wedging.

3. In combination, a rim having mounted thereon a tubeless tire and a cushion positioned interiorly and (coextensive) with the tire to a radius point greater than any portion of the said rim, and said cushion filling a substantial portion thereof: said tubeless tire including inextensible wire bead cores having diameters corresponding to the diameter of the rim seats sufficiently to effect a forced airtight seal therewith when forced over increasing diameter bevels, said rim being of the drop center type having one or more drop centers, and having along the outer edges of said drop center aligned substantially flat tire and buffer bead seats with minimum radial and lateral rounded bevels from said drop center to said substantially flat tire and buffer bead seats, the outer ends of said seats being bordered by upstanding flanges against which said beads bear, said flanges having substantial tops capable of bearing the entire loads borne by said buffer, one of said flanges being removable to facilitate assembling the rim, tire and/or buffer, said rim tire bead seat adjacent said removable flange being laterally elongated from said substantially flat tire bead seat portion and beveled to lesser diameters towards said removable flange over said lateral elongation sufficiently to install the said tire bead to an airtight fit with said rim by utilizing flange bolt securing to force said tire bead over said elongated bevel to the point of airtight fit near or at the point of reaching said substantially flat tire bead seat portion, said removable flange having a hooked shape towards said rim center providing means whereby said hook tip serves as the tire wire bead core of a reciprocally hooked extensible bead tubeless tire, said hooked bead flange tip serving as means to hold said reciprocally hooked bead tubeless tire bead in lateral location and prevent dirt wedging said tire bead from said flange hook, said flange hook tip providing means to force a regular tubeless tire over said elongated seat bevel to the point of airtight fit near or at the said substantially flat tire bead seat and to serve as means whereby a tire shield projection can be extended under said tubeless tire portion and secured inside said hooked flange to hold said regular tubeless tire in lateral location against dirt wedging, said drop center being enlarged to provide air space to offset air space taken up by said buffer and to provide more iron surface to radiate heat from enclosed tire air, said buffer having means to extend under said tire bead and engage said hooked flange.

4. A drop center rim for pneumatic tubeless tires with one or more bolted removable flanges characterized by having in combination one or more drop centers and having along the flange side edges of said drop center, aligned substantially flat tire bead and buffer bead seats, with only minimum rounded bevels adjacent said drop center, the outer ends of said seats being bordered by upstanding flanges against which said beads bear, said flanges having tops capable of bearing the entire loads of internal buffers, one or more of said flanges being removable to facilitate assembling the rim, a tire and/or buffer, said removable flange having a hooked shape towards the rim center the tip of which can serve as the wire bead core of reciprocally hooked shaped extensible beaded tubeless tires and holding said tire against lateral dirt wedging, said hooked flange when used with regular tubeless tires capable of enclosing and retaining a bead attached to reinforcing means extending under said tire bead said reinforcing means attached to means inside said tire whereby said regular tubeless tire bead is held laterally against dirt wedging, said substantially flat tire bead seats adjacent said removable flange being extended laterally a distance equal to the lateral spread of said flange hook and said bead extension beveled to less diameters towards said removable flange whereby said removable flange bolt securing forces tubeless tires with substantially inextensible beads to an airtight fit near or on the said substantially flat tire bead seat as said flange bolt securing compresses tire bead material between said inextensible bead core and the increasing rim diameters.

5. In a wheel comprising a rim, a tubeless tire mounted thereon enclosing an internal buffer, a drop center rim characterized by having in combination one or more drop centers and having along the flangeward edges of said drop center minimum radial and lateral bevels to aligned substantial flat tire bead and buffer bead seats, the outer ends of said seats being bordered by upstanding flanges against which said beads bear, one or more of said flanges being removable to facilitate assembling the rim, tire and/or buffer, said removable flange top formed of a hook shape extending laterally inward and then radially downward whereby the hook tip serves as the substantially inextensible wire bead core of a reciprocally hooked bead extensible bead tubeless tire to effect an air seal and to hold said tire bead laterally against dirt wedging and when used with a regular tubeless tire with a buffer providing means for securing both tire and buffer laterally against dirt wedging, said substantially flat tire seat adjacent said removable flange being extended laterally a distance substantially equal laterally to the lateral spread of said hook of said flange and being beveled to lesser diameters towards said removable flange whereby said removable flange securing can compress tire bead material between said inextensible tire bead wire core and increasing diameters of rim seat bevel until an airtight fit is secured at or near the point of reaching said substantially flat tire bead seat, said rim having means to facilitate assembly and utilization of rim extending internal buffers principally bearing radially on the top of the rim flanges.

6. An internal tire buffer composed of flexible material having means to buffer pneumatic tires and reduce wheel drop characterized by having in combination a thin reinforced membrane coated with air sealing material capable of extending under the bead of a tubeless tire and terminating in a substantial bead outside said tire whereby said outside buffer bead can be engaged in a hooked shaped rim removable flange whereby said tubeless tire and said buffer are secured against lateral dirt wedging and curve negotiation lateral displacement of said tire and buffer from said removable flange.

References Cited by the Examiner

UNITED STATES PATENTS

| | | | |
|---|---|---|---|
| 826,143 | 7/1906 | Cole | 152—397 |
| 1,423,674 | 7/1922 | Munson | 152—396 |
| 1,693,909 | 12/1928 | Michelin | 152—396 |
| 2,014,811 | 9/1935 | Mayer | 152—409 |
| 2,021,240 | 11/1935 | Main | 152—381 |
| 2,074,284 | 3/1937 | Stevenson | 152—158 |
| 2,224,066 | 12/1940 | Shore | 152—158 |
| 2,242,788 | 5/1941 | Marks | 152—158 |
| 2,427,634 | 9/1947 | Temple | 152—409 |
| 2,911,028 | 11/1959 | Sinclair et al. | 152—409 |
| 2,922,457 | 1/1960 | Hrdlicka | 152—410 |

ARTHUR L. LA POINT, *Primary Examiner.*

C. W. HAEFELE, *Assistant Examiner.*